United States Patent [19]

Jaśniewicz et al.

[11] 4,133,077

[45] Jan. 9, 1979

[54] METHOD FOR OBTAINING OF MEAT FROM MARINE CRUSTACEA, ESPECIALLY FROM ANTARCTIC KRILL

[75] Inventors: Zbigniew Jaśniewicz, Gdańsk-Oliwa; Jan Knyszewski, Gdynia; Tadeusz Ośrodek, Gdansk-Oliwa; Lech Stefański, Gdynia, all of Poland

[73] Assignee: Prezedsiebiorstwo Polowow Dalekomorskich i Uslug Rybackich "Dalmor", Gdynia, Poland

[21] Appl. No.: 831,260

[22] Filed: Sep. 7, 1977

[30] Foreign Application Priority Data

Sep. 14, 1976 [PL] Poland ................................. 192426

[51] Int. Cl.² ............................................. A22C 29/00
[52] U.S. Cl. ............................................. 17/48; 17/71
[58] Field of Search ....................................... 17/71, 48

[56] References Cited

U.S. PATENT DOCUMENTS

| 3,875,614 | 4/1975 | Lapeyre | 17/48 |
| 4,038,722 | 8/1977 | Terase et al. | 17/48 |
| 4,053,964 | 10/1977 | Rutledge | 17/48 |

*Primary Examiner*—Donald R. Schran
*Attorney, Agent, or Firm*—Haseltine, Lake, & Waters

[57] ABSTRACT

In accordance with the method invented for obtaining meat from the abdominal section of a body of Antarctic krill, a thermal treatment is applied, this treatment being followed by subjecting the treated krill to acceleration by using mechanical, hydraulic or pneumatic means, and to a sudden deceleration (braking), in order to cause the destruction of the krill body and to extract the meat out of the abdominal section of this body, the edible meat of krill being then separated from other non-edible fragments of the body by using a hydro-dynamic or gas-hydro-dynamic method, namely by flotation.

5 Claims, No Drawings

METHOD FOR OBTAINING OF MEAT FROM MARINE CRUSTACEA, ESPECIALLY FROM ANTARCTIC KRILL

This invention relates to a method for obtaining pure meat from the abdominal section of a marine crustacea body, especially from the abdominal section of a fresh or freezed Antarctic krill, especially directly in ships operating in krill fishing waters.

This invention relates to technology methods to be used in processing of marine crustacea, especially in processing of the Antarctic krill of the Euphasia Superba order to obtain the meat from the abdominal section of this sea animal.

There is a known method used in the production of Krill "Ocean" Paste, this method using technology developed in the Soviet Union. In accordance with this method a liquid phase is introduced into the krill body by pressing and amassing the bodies in tanks, this phase being then pumped, after settling, to special thermal coagulators where the protein contained in the liquid phase becomes coagulated by heating the liquid phase up to the boiling point.

There is also a known method used in production of an edible protein coagulate obtained from the Antarctic krill. In accordance with this method the antarctic krill is subjected to a preliminary pressing process to separate and to remove from the krill body only the content of the digestive tract. The product thus obtained is then thermally treated in order to coagulate the protein contained in the product. The product is then rinsed in water while cooling it quickly, at the same time, the rinsing water is separated by centrifuging, the product is subjected to a further breaking up process, and non-edible elements, particularly the chitine elements, are then separated and removed from the process, to be processed into fodder flour. The finished product is an edible protein coagulate obtained from the krill.

There is also another known method used in the production of krill meat paste. In accordance with this method a freshly hauled krill is centrifuged to remove the content of the digestive tract, and is then thermally treated, this treatment being followed by quick cooling and then freezing into blocks to the temperature of −22° C. After storing in the frozen state the krill is defrosted and centrifuged to separate the water, the non-edible elements, particularly chitine elements, are separated by subjecting the material to a suitable mechanical process, and a pure meat paste is then frozen into blocks.

There is not, however, a suitable method known in the industry to obtain from marine crustacea, particularly from the abdominal section the Antarctic krill, of pure meat in the form of whole muscles or broken pieces.

There are several imperfections inherent in the above described methods used for obtaining an edible product.

The greatest disadvantage of the first described method is the fact that when the liquid fraction is pressed out of the krill the content of the digestive tract and a considerable amount of chitine shell of the animal is forced into this fraction. At the same time a large amount of protein remains in the pomace thus impairing the production efficiency. The consistency of the krill paste obtained by this method from the krill is dry, this being a disadvantage from the point of view of organoleptic valuation.

Also in the second and third methods mentioned above there are disadvantages as regards the quality of the finished product. Products obtained in accordance with these methods, a protein coagulate and meat paste obtained from the krill, are very crumbly with a pasty consistency, this being a shortcoming in view of qualities required in this respect in culinary practice, in processing of preserves, and in gastronomy of protein substrates of animal origin mainly.

The krill is a shrimplike animal a little smaller than the shrimp itself, its body structure being more delicate than that of the shrimp, and its chitine shell being softer. The krill body consists of the cephalothorax and of the abdomen. The abdomen is the body section containing the meat sought after in the crustacea. The organoleptic qualities of this meat, including the meat of the shrimplike krill, particularly its flavor, consistence and color, equal those of the most exquisite meat products of marine origin.

The object of this invention is to develop a new method for obtaining edible meat from the abdominal section of the body of shrimplike krill, this method eliminating the disadvantages of other known methods. This object has been realized by inventing a method in which substantial modifications are introduced to the technology of obtaining meat from the Antarctic krill.

In accordance with the invented method for obtaining meat from marine crustacea, especially from the abdominal section of the body of an Antarctic krill of the Euphasiacea order, the freshly fished or defrosted krill is subjected to a thermal treatment without previously processing the krill in accordance with the hitherto used methods, this thermal treatment being applied to cook the krill and to coagulate the protein contained in the krill. The invented process is applied as follows. In accordance with the thermal treatment which consists in cooking, the whole freshly fished or defrosted krill is either heated up, for 0.5 to 15 min., to a temperature of 70° C. to 110° C. in an aqueous medium, or is treated with saturated steam under normal or raised pressure, for 0.5 to 30 min. at the temperature of 70° C. to 150° C. As a result of this process the protein contained in the krill becomes coagulated. To cool it down the krill is then rinsed in water at preferably ambient temperature. In the next operation in accordance with the invented method the thermally treated, rinsed and cooled krill is subjected to short lasting acceleration by using a mechanical, hydraulic or pneumatic method, and is then abruptly decelerated (braked). The purpose of this operation is to partially mechanically destroy the chitine shell of the animal, to separate the cephalothorax from the abdomen, and to extract the meat out of the abdominal section. The mechanical acceleration is preferably applied by a mechanical system acting upon the krill by preferably centrifugal force so, that while accelerated the krill is subjected, many times, to a dynamic contact with sharp-edged elements provided over the working surface of the mechanical system, this contact causing subsequent partial destruction of the chitine shell of the animal. In accordance with this invention the krill is mechanically accelerated to a value equal to 50 to 1500 units of gravity acceleration preferably in the presence of a liquid, mainly water. In the case of hydraulic acceleration this acceleration is applied, by means of a stream of liquid, to the value of 5 to 50 units of gravity acceleration. In the case of pneumatic acceleration the acceleration is applied by means of a stream of gas, preferably by means of a stream of filtered compressed air, to the value of 50 to 200 units of gravity acceleration. A hydraulic and/or pneumatic acceleration can be realized by means of a preferably closed system containing a great number of sharp-edged elements provided over the working surface, this surface constituting a closed circuit for the hydraulic liquid or gas, a partial destruction of chitine shell of the animal taking place in this circuit as a result of recurrent contact with sharp-edged elements in the circuit, this recurrent contact resulting from applied acceleration.

In accordance with the invented method the mechanically, hydraulically or pneumatically accelerated krill is then decelerated by mechanical means used in the system in the form of bars, screens, perforated partitions or faces having preferably sharp elements. Deceleration is applied in order to separate the animal abdomen from the cephalothorax and to extract, at the same time, the meat out of the abdominal section.

After the thermal treatment, and after rinsing and cooling, accelerating and decelerating operations used in order to destroy the chitine shell, to separate the abdomen from the cephalothorax and to extract, at the same time, the meat out of the krill abdominal section, a mixture is obtained, this mixture consisting of edible meat of the krill, the chitine fragments and other non-edible parts of the body. This mixture is then subjected to a separation treatment by using a hydro-dynamic or a gas-hydro-dynamic method.

In accordance with the hydro-dynamic method (flotation), the abdominal meat is separated in an aqueous phase so that a layer settles in the bottom of a water bath, while other non-edible parts of the krill body remain floating on the water surface. In accordance with this invention the hydro-dynamic separation is obtained in cold or heated water with an addition of a surface active agent, this water contained preferably in a special tank. The gas-hydro-dynamic method (flotation) applied in accordance with this invention to separate the abdominal meat of the krill from other non-edible body parts is carried out in a mixture of water and gas and/or gases, this mixture being obtained by known methods. The best gas agent to be used is filtered air or gases in an "in statu nascendi" form. The hydro-dynamic and/or gas-hydro-dynamic method for the separation process (flotation) used to obtain a pure edible meat of krill is carried out, in accordance with this invention, preferably in a closed system filled preferably with water, wherein the abdominal meat settles in the bottom of this system, while the non-edible elements of the krill body remain in the upper part of this system. The upper layer consisting of non-edible parts of the krill body is removed by mechanical means used together with overflowing of this layer by adding water. The whole or crumbled pieces of abdominal meat of the shrimplike krill are obtained by draining the water together with meat off the bottom of the system. The excess water is then separated from the meat by conventional methods.

The finished product thus obtained is suitable for consumption, can be subjected to further processing, or can be frozen for storing.

The invented method meets the requirements of the desired object and offers several technical and technological benefits. The obtained product, namely the whole or crumbled pieces of meat extracted out of the abdominal section of the body of the Antarctic krill, have very advantageous structural and organoleptic qualities similar to those obtained in processing of the meat of crayfish and of shrimp, these qualities being superior to those found in krill processed by known methods. The end output of the invented process reaches up to 20 percent of the pure krill meat. The thermal processing of the whole krill in accordance with the invented method enables retention of those microelements and vitamins of the meat which are to a large degree lost in the after-coagulation waste water in the production of protein coagulate.

The invented method will now be described in detail by way of specific examples.

EXAMPLE 1

The freshly caught krill is subjected to a thermal treatment by heating it in water at a temperature of 70° C. for 15 minutes, and is then rinsed in a stream of water to cool it down to the ambient temperature. Next the krill is accelerated in a mechanical rotating installation whose inner walls are equipped with a series of sharp-edged elements. All the krills are simultaneously accelerated to the value of 50 units of gravity acceleration and destruction begins of the chitine shell of the animals, the shell being nicked by the sharp-edged elements of the rotating installation. The mechanically accelerated krill is then suddenly decelerated (braked) by a mechanical obstacle put across the path of its motion, this obstacle having the form of metal bars elastically mounted in at least one row. A sudden deceleration causes all the krills to be pushed against the obstacle, a dynamic separation of the cephalothorax from the abdomen takes place, the previously nicked chitine shell is stripped off the krill body together with a spongy protein layer grown with the shell, this layer being partially disjoined from the meat, and the meat is extracted out of the abdominal section of the body. A mixture of meat and of other fragments of the krill body is directed to a water bath in the installation, where the meat is hydro-dynamically separated from the non-edible parts of the krill. The meat settles in the bottom of the bath, while the non-edible fragments of the krill body remain in the upper layers in the bath, said upper layers having the form of an aerated layer, wherefrom said non-edible fragments are drained off by overflow caused by added water, said draining being assisted by mechanical skimming. After the upper layer containing the waste fragments of the krill body is removed, the water is drained off the bath and the meat remains in the bottom of the installation. After excess water is separated from the meat by using conventional methods (e.g. straining), about 0.22 kg of pure edible meat is obtained from 2 kg of a freshly caught krill, this meat being whitish-pink in color and having a flavor similar to that of crayfish or shrimp meat. The waste in an amount of 1.52 kg can be used for further processing into fodder flour.

EXAMPLE 2

A defrosted krill is subjected to a thermal treatment by cooking under raised pressure in water at a temperature of 110° C. and for a time not shorter than 0.5 min, this treatment being followed by rinsing in a stream of water to cool the krill to the ambient temperature. Next the krill is placed in an accelerating installation to rotate it at a considerable speed and accelerate all the krills contained in the installation to an acceleration of the order of 1500 units of gravity acceleration, this treatment having a destructive effect on the chitine shell by the dynamic action of centrifugal force. A krill thus accelerated is caused to leave the accelerating installation and to meet, in its path, a braking obstacle, this braking obstacle having the form of vertical bar elements arranged in several rows. A sudden braking causes the cephalothorax to separate from the abdomen and the meat to be extracted, at the same time, out of the abdomen. A mixture of meat and other fragments of the krill body is directed to a water bath wherein a gas-hydro-dynamic separation of the meat and body fragments takes place. Compressed air is introduced into the bath, the meat settles in the bottom of the bath, and the other, non-edible, fragments of the krill body in the upper layers of the bath wherefrom they are removed as described in Example 1. After the processing is completed as described in Example 1, about 0.346 kg of pure edible meat is obtained from 5 kg of krill.

EXAMPLE 3

A freshly caught krill is subjected, for a time not longer than 30 min., to a treatment in saturated steam at a temperature of 70° C. Next the krill is accelerated by a hydraulic method in a system consisting of a tube open at both its ends, a plurality of sharp-edged elements, e.g. spikes, being provided on the inner face of the tube. Acceleration is obtained by means of a stream of hydraulic liquid, preferably water, this hydraulic stream accelerating the krill to an acceleration of the order of 5 units of gravity acceleration until a velocity approximately equal to the velocity of the stream is achieved. The accelerated krill is then caused to leave the accelerating installation and to meet, in its path, a braking obstacle as described in Example 2. A sudden braking causes the krill body to break up and the meat to be extracted out of the abdominal section of the body. The obtained mixture containing the meat and other fragments of the krill body is directed to a water bath containing an addition of a surface active agent, wherein the pure edible meat is hyrodynamically separated from other, non-edible parts of the body in a way described in Example 1.

EXAMPLE 4

After defrosting the whole bulk of krill is subjected, for a time not shorter than 0.5 min., to a thermal treatment by saturated steam at a temperature of 150° C. Next, after rinsing in water, the cooled krill is accelerated in an installation as described in Example 3, wherein by using a hyraulic method an acceleration of the order of 50 units of gravity acceleration is obtained. The accelerated krill is then caused to leave the accelerating installation and to meet, in its path, an obstacle in the form of a gridwork made up of bars. A sudden braking action causes the krill body to break up, and the meat to be extracted out of the abdominal section of this body. The obtained mixture containing the meat and other fragments of the krill body is directed into a water bath to which filtered air is introduced. A gas-hydrodynamic separation of meat takes place, the meat settles in the bottom of the bath, while the non-edible parts of the body are removed, in the form of an aerated mass, from the bath surface by overflow caused by added water. After the water is drained off the bath a pure meat remains in the bottom. Excess water is then removed from the meat by using the conventional methods, and the meat is directed for processing or freezing. The waste elements of the krill body removed from the surface layer of the active water bath are directed to processing into fodder flour.

EXAMPLE 5

A fresh krill is subjected to a thermal treatment as described in Example 1, and then, after rinsing in water the cooled krill is accelerated in a pneumatic installation consisting of a tube open at both its ends, a plurality of sharp-edged elements being provided on the inner face of the tube, this tube forming a closed circuit for a stream of air under pressure of 5 kg/sq.m. The stream of air accelerating the krill to the value of 50 units of gravity acceleration causes the krill to accelerate up to the velocity of the stream of air while the sharp-edged elements partially destroy the chitine shell of the krill. The accelerated krill is then caused to meet in its path an obstacle as described in Example 4, a sudden braking action of this obstacle causing the krill body to break up and the meat to be extracted out of the abdominal part of the body. A mixture containing the meat and other parts of the krill body is then subjected to a separation by a hydro-dynamic or gas-hydro-dynamic method as described in Example 1 and in Example 2.

This invention is suitable for use in industrial scale production processing of protein containing non-fish sea food products, particularly in mass production of meat of the antarctic krill.

The invention as disclosed in this specification presents only a fraction of the possible applications of the invented method, this method being applicable in various claimed variants.

What we claim is:

1. A method for obtaining meat from the abdominal section of Antarctic krill, comprising the sequential steps of cooking the krill in water or steam at a temperature in the range of 70–150° C., cooling the cooked krill in a water bath having a salinity not higher than 4 percent at ambient temperature, imparting to the krill an acceleration to a value of 5–1500 g in a closed system containing a plurality of sharp-edged elements provided on its working surface to initiate destruction of the chitine shell of the krill, subjecting the accelerated krill to sudden deceleration by means of mechanical ob-stacles introduced across the path of the accelerated krill in order to separate the animal abdomen from the cephalothorax and to extract edible meat from the abdominal section of the krill by fragmentation introducing the krill fragments into an aqueous bath whereby the edible meat settles to the bottom of the bath and the non-edible fragments float in a layer on the surface of the bath, separating the non-edible fragments from the bath and re-moving the edible meat from the bath.

2. The method of claim 1 wherein the deceleration step is effected by mechanical elements in the form of bars, screens or perforated partitions, said mechanical elements being provided with sharp-edged elements.

3. The method of claim 1 wherein the bath comprises aerated water.

4. The method of claim 3 wherein the layer of non-edible fragments is removed by the addition of water to the bath causing the layer to overflow.

5. The method of claim 2 wherein the bath comprises aerated water, the layer of non-edible fragments is removed by the addition of water to the bath causing the layer to overflow and the edible meat is removed by draining off a stream of water from the bottom of said bath.

* * * * *